United States Patent [19]

Bivens

[11] Patent Number: 4,547,922
[45] Date of Patent: Oct. 22, 1985

[54] TOP BRUSH CONSTRUCTION WITH INFLATABLE CENTER SECTION

[75] Inventor: David J. Bivens, Danville, Va.

[73] Assignee: Bivens Winchester Corporation, Danville, Va.

[21] Appl. No.: 572,116

[22] Filed: Jan. 19, 1984

[51] Int. Cl.[4] ............................................. B60S 3/06
[52] U.S. Cl. ............................. 15/97 B; 15/DIG. 2; 15/230; 15/230.14; 15/230.16
[58] Field of Search ............... 15/21 D, 21 E, 23, 34, 15/49 C, 53 A, 53 AB, 55, 57, 77, 88, 82, 97 R, 97 B, 102, 179, 181, 230, 230.11, 230.14, 230.19, 230.15, DIG. 5, DIG. 2, 230.17

[56] References Cited

U.S. PATENT DOCUMENTS

| | | | |
|---|---|---|---|
| 689,590 | 12/1901 | Johnson et al. | 15/230 X |
| 3,543,319 | 12/1970 | Posner | 15/53 A |
| 3,774,259 | 11/1973 | Genaro | 15/97 B |
| 4,250,591 | 2/1981 | Mello | 15/97 B |
| 4,377,878 | 3/1983 | Pecora | 15/97 B |

*Primary Examiner*—Edward L. Roberts
*Attorney, Agent, or Firm*—Krass and Young

[57] ABSTRACT

A rotary brush for vehicle washing systems comprising first, second and third sections of radially extending felt strips, the lengths of said strips being such that the overall outer diameter of the brush when rotating is uniform but the second or central section being mounted on a large diameter inflatable cushion which reduces or eliminates the damaging effect of abrupt contact between the vehicle and a support shaft for the brush. In the preferred embodiment the cushion comprises a series of inflatable rubber inner tubes captured within a felt covering having a zipper and drawcords for installation and removal purposes.

9 Claims, 4 Drawing Figures

TOP BRUSH CONSTRUCTION WITH INFLATABLE CENTER SECTION

This invention relates to the construction of rotary cleaning devices which are used in car washes and the like to remove dirt from finished automobile surfaces and particularly to an improved construction for such devices which maximizes the cleaning action but minimizes the possibility of accidental destruction or damage both to the vehicle being cleaned and to the cleaning apparatus itself.

BACKGROUND OF THE INVENTION

Prior art car washing systems commonly utilize rotary brushes consisting of a motor driven shaft and a covering of long plastic strands which contact a vehicle being washed to remove dirt and grime. Water or the combination of water and detergent is typically sprayed in abundance onto the vehicle surface as the brush contacts the vehicle.

Another prior art car washing device comprises a curtain or series of curtains made up of vertically depending cloth strips, usually felt, which hang into the path of the vehicle and which contact vehicle surfaces in a scrubbing fashion as the vehicle passes along a wash lane, or in the case of a rollover washer, as the gantry containing the cloth curtain passes over the stationary vehicle. Again, water or the combination of detergent and water is sprayed onto the vehicle during the scrubbing function. In some cases the scrubbing action is enhanced by reciprocal lateral motion of the hanging curtain.

Based in part on the belief that the cloth strip is less harmful to the painted surfaces of the vehicle, a preference seems to be developing for the cloth strip washes. However, it is generally recognized that the hanging cloth strip washer, even with the reciprocal lateral motion features described above, is inferior to a rotary brush as far as the scrubbing function is concerned. Attempts have been made to produce a rotary brush consisting of cloth strips rather than plastic bristles, but this device has been unsuccessful for two reasons: first, the cloth strips are fairly long and tend to hang up on wiper blades and antennas and, in some cases, to bend or even tear these accessories off the vehicles and (2) the cloth strips tend to cave in when a vehicle approaches a brush and this often results in damage to the support shaft or to the vehicle due to direct contact between the vehicle and the shaft.

SUMMARY OF THE INVENTION

This invention provides a brush-like rotary cleaning device for vehicle washing systems which essentially combines the advantages of the bristle brush and the cloth strip washer but which eliminates the disadvantages of both devices. In principle, the device is a rotary brush having cloth strips rather than plastic bristles for engagement with the surfce to be cleaned. However, the present invention further comprises a support system for the cloth strips which is composite in nature and comprises a soft or radially resilient center section of large diameter thus permitting the use of relatively short cloth strips, and opposite end sections contiguous with the center section in which the support shaft is relatively rigid, of small diameter and which permits the use of relatively long cloth strips for engagement with the vehicle.

In a preferred embodiment, the support system is made up of a relatively small diameter shaft which defines the overall width of the brush device and a center section which mounts on the shaft and which comprises essentially an inflatable toroid preferably made up of several chambers, covered with a wrapper to which the short length cloth strips are attached. The longer length cloth strips are attached by suitable means to the small diameter shaft on longitudinally but contiguous sides of the inflatable toroid. In this fashion, the center section not only permits the shorter strips which are far less likely to damage a vehicle or vehicle accessories but further provides a resilient bumper, buffer or cushion which is capable of absorbing impact with a vehicle and preventing or minimizing damage to the shaft in the event of rough or abrupt engagement with the vehicle.

DETAILED DESCRIPTION OF THE SPECIFIC EMBODIMENT

Figure 1:
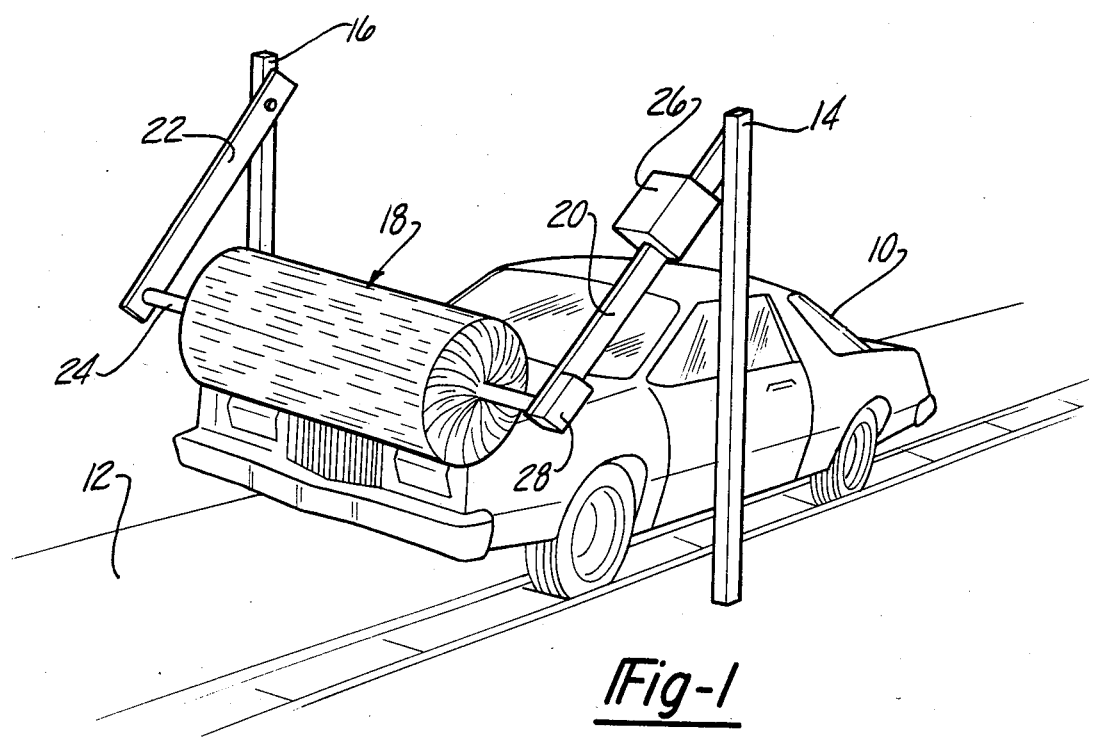
FIG. 1 is a perspective view of a vehicle washing apparatus employing the invention.

Referring now to the drawing. FIG. 1 illustrates a vehicle 10 progressing through a wash lane 12 such as by conveyor chain or push-roller or other conventional and well-known system for moving vehicles through automatic washing apparatus. Stationed on opposite sides of the wash lane 12 and with sufficient clearance to permit the free passage of the vehicle 10 are posts 14 and 16 which pivotally support a horizontal brush 18 which contacts the front, top and rear surfaces of the vehicle 10. Means (not shown) are used in combination with the apparatus of FIG. 1 to spray water or a combination of water and detergent on the vehicle 10 to assist in the cleaning function.

Rotary brush 18 is supported between pivot arms 20 and 22 which together carry a rotary shaft 24. A motor 26 is mounted on arm 20 and coupled with gear box 28 in a conventional and well-known fashion to rotate the brush 18 about its own horizontal axis at a speed of about 95 rpm.

It is to be understood that while the environment of the invention is illustrated in FIG. 1 to comprise a stationary wash apparatus and means for causing motion of the vehicle 10, the invention is equally applicable to rollover gantry type car washing systems in which the vehicle remains stationary and a wash gantry carrying the brushes and sprays moves longitudinally back and forth on tracks to perform the washing function.

Figure 2:
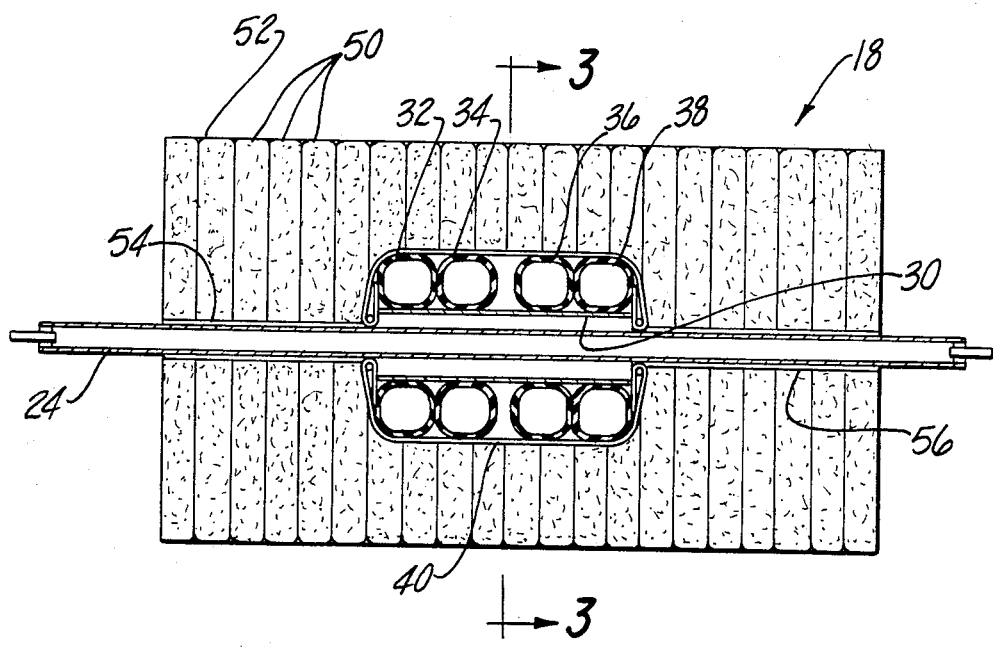
FIG. 2 is a cross-sectional view of a horizontal brush for the car washing apparatus of FIG. 1 and embodying the invention.
Figure 3:
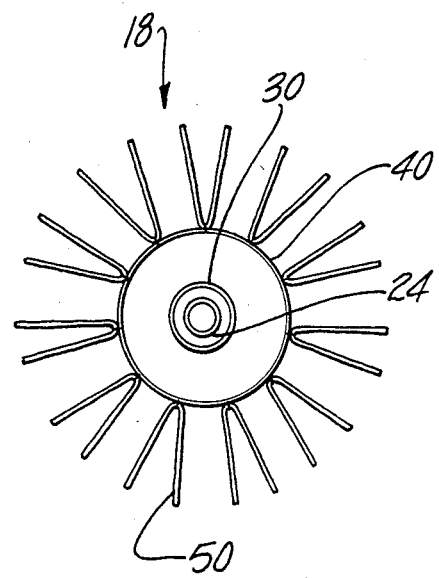
FIG. 3 is a sectional view through the brush of FIG. 2.
Figure 4:
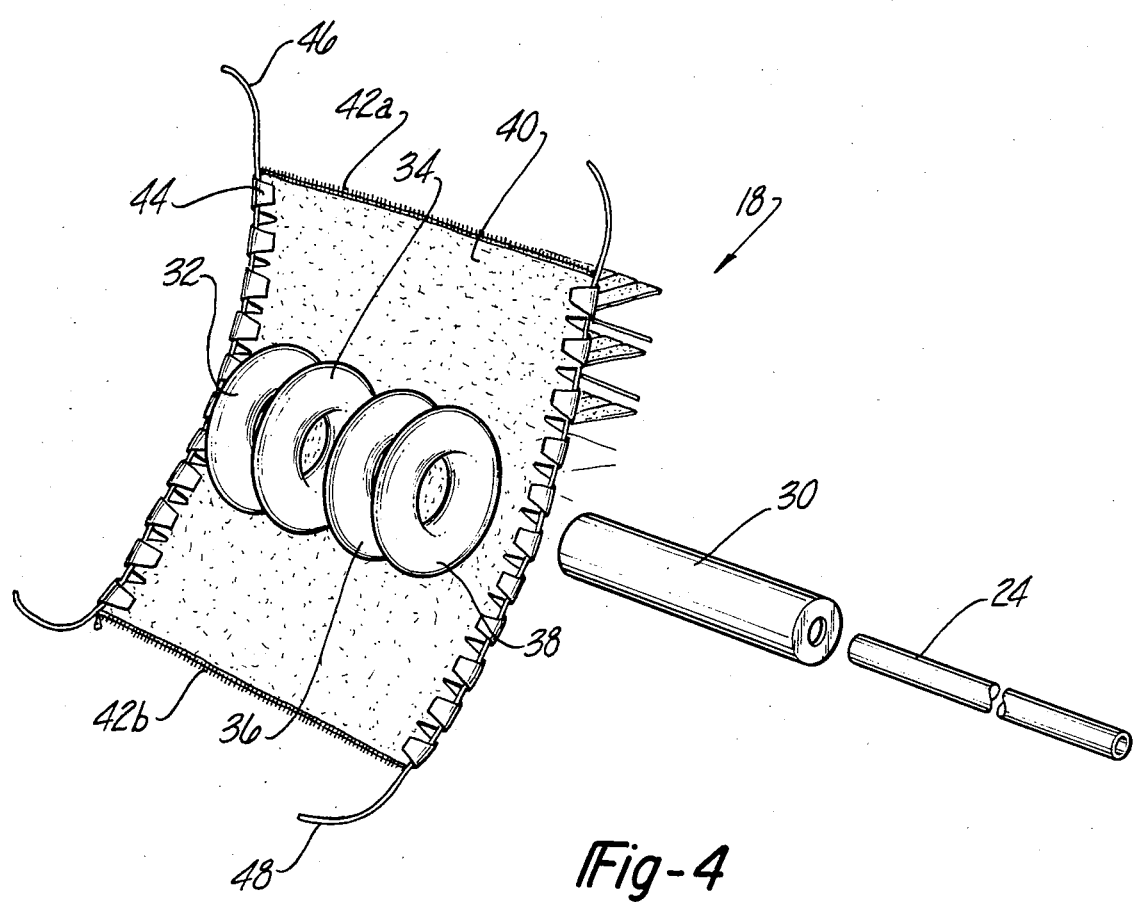
FIG. 4 is an exploded view in perspective of the components of the brush of FIG. 2.

Referring now to FIGS. 2 through 4, the details of the brush 18 and the novel construction thereof will be described. Brush 18 comprises a hollow steel shaft 24 of 3 ½ inch diameter and approximately 118 inches in length forming the main support element for the brush 18 and the connection thereof to the pivot arms 20 and 22 shown in FIG. 1. Mounted on the center of the shaft 24 and coaxial therewith is an 8 inch diameter round steel tube 30 of approximately 34 inches in length and welded or otherwise secured to the shaft 24 so as to occupy a fixed, centered position. Mounted on the tube 30 are four inflatable toroidal chambers made up of rubber inner tubes, 32, 34, 36, and 38, the size and diameters of the inner tubes 32, 34, 36, and 38 being chosen so as to fit snugly and securely on the large diameter tube 30. A gap of two or three inches is preferably left between tubes 34 and 36 but the tubes in the pairs 32, 34 and 36, 38 are preferably snugly adjacent one another. A needle punched felt cover or backing 40 approximately 68×56 inches in size is wrapped over the tubes 32, 34, 36 and 38 and snugged to the shaft 24 to maintain the tubes in place.

As best illustrated in FIG. 4 the securement of the backing 40 is readily achieved by fastening a zipper comprising conjugal sections 42a and 42b along opposite lengths thereof such that the zipper section 42a and 42b may be closed upon one another, the axis of the zipper running parallel to the shaft 24. The other ends of the backing 40 are provided with tabs 44 which are folded over and sewn in place to provide a passage for cord 46 which may be pulled tight and tied together to bring-in and tie down the ends of the backing 40 to the configuration best shown in FIG. 2. Cord 48 is provided in the opposite side for similar purposes.

Over the center section of the brush 18 short needle-punched felt strips are sewn to the backing 40 in the fashion shown in FIG. 3 and with at least approximately the spacing as shown in FIG. 3. The short strips are about 12 inches in effective radial length when doubled over and sewn in place as shown in FIG. 3. Longer needle-punched felt strips 52 are secured to backings 54 and 56 which are secured to the shaft 24 contiguously with the backing 40 in the center section. The long strips 52 are about 32 to 34 inches in effective radial length; i.e. of such length as to provide a substantially uniform radius brush effect when, as previously mentioned, the brush unit 18 is rotated about its own axis at a speed of approximately 95 rpm. This speed has been found to make the brush felt strips 50 and 52 stand out to full length while nevertheless being too slow to produce either a slapping effect or a damaging contact with the vehicle 10.

The tubes 32, 34, 36 and 38 may, in the illustrative embodiment described herein, be inflatable 18-850×8 vehicle inner tubes but a variety of other resilient toroidal cushion devices having a similar effect may be employed as alternatives. The cloth strips 50 and 52 are about ½ inch in width but may vary according to the designer's preference. A variety of materials including needle punched felt and synthetics may be used.

I claim:

1. A rotary brush like device for vehicle washing systems comprising:
    a support shaft having a given length;
    radially resilient cushion means mounted centrally of such shaft but of lesser length than said shaft;
    a first plurality of radially extending scrubber elements mounted on and over said radially resilient means;
    second and third plurality of radially extending scrubber elements mounted on and over the end segments of said support shaft which are outboard of but contiguous with said resilient means;
    the first second and third pluralities of scrubber elements being of such effective radial length as to produce a uniform overall outer diameter of said brush like device over the entire length thereof.

2. Apparatus as defined in claim 1 wherein said radially resilient cushion means comprises a plurality of inflatable tubes disposed substantially laterally adjacent one another about a common axis.

3. Apparatus as defined in claim 2 further including rigid support means mounted centrally on said support shaft and supporting said tubes;
    cover means of flexible material extending externally over and around said tubes to maintain them as an effectively integral unit.

4. Apparatus as defined in claim 3 further including zipper means for closing said cover means on itself.

5. Apparatus as defined in claim 1 wherein said first, second and third pluralities of scrubber elements are strips made of needle-punched felt.

6. Apparatus as defined in claim 1 further including means for rotating said brush like device about its own longitudinal axis.

7. A felt strip scrubber for vehicle washing systems comprising:
    first and second longitudinal end sections comprising radially extending felt strips of a first length, a central section contiguous with and between said end sections comprising felt strips of a second substantially shorter length than said first length and support means within said central section and arranged so that the overall outer diameter of said device along the entire length thereof is substantially uniform, said support means comprising cylindrical, radially resilient cushion means.

8. Apparatus as defined in claim 7 wherein said radially resilient cushion means is inflatable.

9. Apparatus as defined in claim 8 wherein said radially resilient support means comprises a plurality of inflatable toroidal air chambers.

* * * * *